(12) United States Patent
Kampitsch et al.

(10) Patent No.: US 9,494,282 B2
(45) Date of Patent: Nov. 15, 2016

(54) STORAGE CONTAINER FOR CRYOGENIC COMPRESSED GAS HAVING AN INLET

(71) Applicant: Bayerische Motoren Werke Aktiengesellschaft, Munich (DE)

(72) Inventors: Markus Kampitsch, Neukeferloh (DE); Klaus Szoucsek, Haimhausen (DE); Bastian Landeck, Unterhaching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/331,712

(22) Filed: Jul. 15, 2014

(65) Prior Publication Data

US 2014/0326737 A1 Nov. 6, 2014

Related U.S. Application Data

(63) Continuation of application No. PCT/EP2012/073759, filed on Nov. 27, 2012.

(30) Foreign Application Priority Data

Jan. 16, 2012 (DE) .......................... 10 2012 200 554

(51) Int. Cl.
*F17C 5/06* (2006.01)
*F02M 21/02* (2006.01)
*F17C 3/04* (2006.01)

(52) U.S. Cl.
CPC ............ *F17C 5/06* (2013.01); *F02M 21/0221* (2013.01); *F17C 3/04* (2013.01); *F17C 2201/0109* (2013.01); *F17C 2201/056* (2013.01); *F17C 2203/03* (2013.01); *F17C 2203/0629* (2013.01); *F17C 2221/012* (2013.01);

(Continued)

(58) Field of Classification Search
CPC   F17C 5/06; F17C 2227/04; F17C 2221/012; F02M 21/0221
USPC ................................ 220/581–592; 222/464.2
See application file for complete search history.

(56) References Cited

U.S. PATENT DOCUMENTS 3,645,291 A    2/1972   Finney
3,703,976 A *  11/1972  Hughes et al. ................ 220/581

(Continued)

FOREIGN PATENT DOCUMENTS

DE            171 709 A      6/1906
DE            100 31 155 A1  1/2002

(Continued)

OTHER PUBLICATIONS

Corresponding International Search Report dated Feb. 28, 2013 with English Translation (four (4) pages).

(Continued)

*Primary Examiner* — Jeffrey Allen
*Assistant Examiner* — Jennifer Castriotta
(74) *Attorney, Agent, or Firm* — Crowell & Moring LLP

(57) ABSTRACT

A storage container for a motor vehicle for storing cryogenic compressed gas, potentially in an over-critical state, having an inlet for introducing the gas to be stored into a storage volume. The inlet has a plurality of inlet openings that are arranged spaced apart from one another and extend into the storage volume. The arrangement serves for localized cooling of the gas and prevents strong thermoelectric voltages on the wall of the storage container.

12 Claims, 4 Drawing Sheets

(52) U.S. Cl.
CPC . *F17C 2221/033* (2013.01); *F17C 2223/0115* (2013.01); *F17C 2223/036* (2013.01); *F17C 2225/044* (2013.01); *F17C 2227/0309* (2013.01); *F17C 2227/0372* (2013.01); *F17C 2227/04* (2013.01); *F17C 2260/05* (2013.01); *F17C 2265/065* (2013.01); *F17C 2270/0168* (2013.01); *Y02E 60/321* (2013.01)

(56) References Cited

U.S. PATENT DOCUMENTS

| | | | |
|---|---|---|---|
| 4,611,641 A | | 9/1986 | Carter, Sr. |
| 4,987,932 A | | 1/1991 | Pierson |
| 5,022,442 A | * | 6/1991 | Bird .............................. 141/100 |
| 2006/0254676 A1 | | 11/2006 | Pechtold |
| 2010/0018972 A1 | * | 1/2010 | Kao .............................. 220/212 |

FOREIGN PATENT DOCUMENTS

| | | |
|---|---|---|
| DE | 20 2010 012 886 U1 | 2/2011 |
| EP | 0 425 098 A1 | 5/1991 |
| FR | 2 935 774 A1 | 3/2010 |
| WO | WO 2009/063127 A1 | 5/2009 |
| WO | WO 2010/136161 A1 | 12/2010 |

OTHER PUBLICATIONS

German Office Action dated Dec. 18, 2013 with English Translation (ten (10) pages).

* cited by examiner

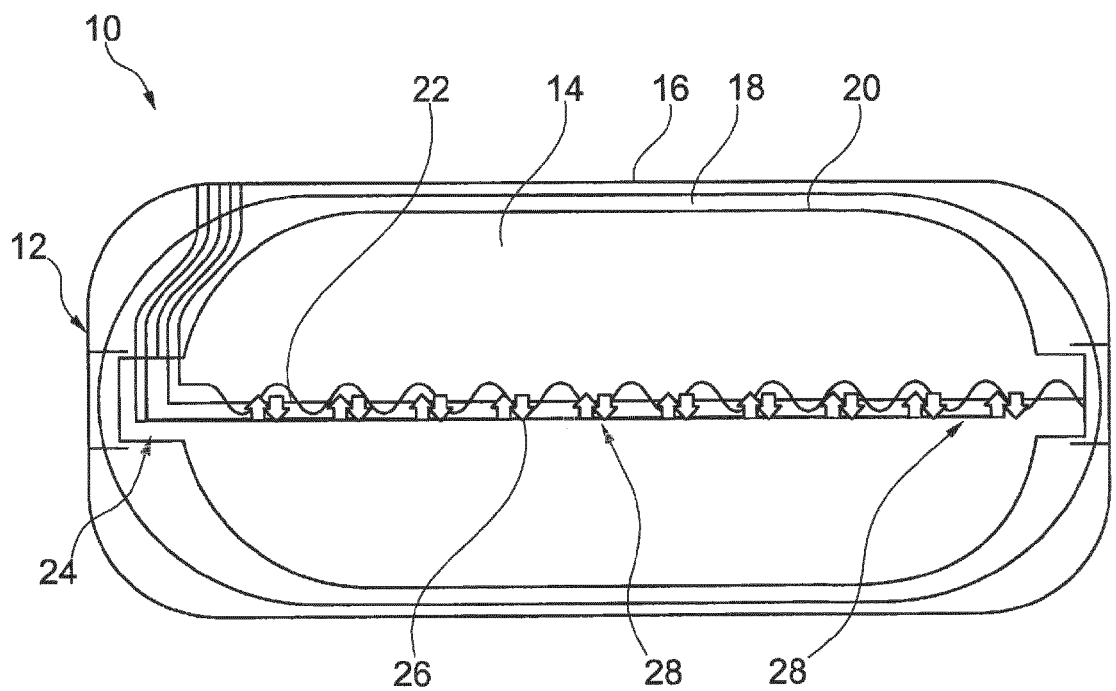
Fig. 6
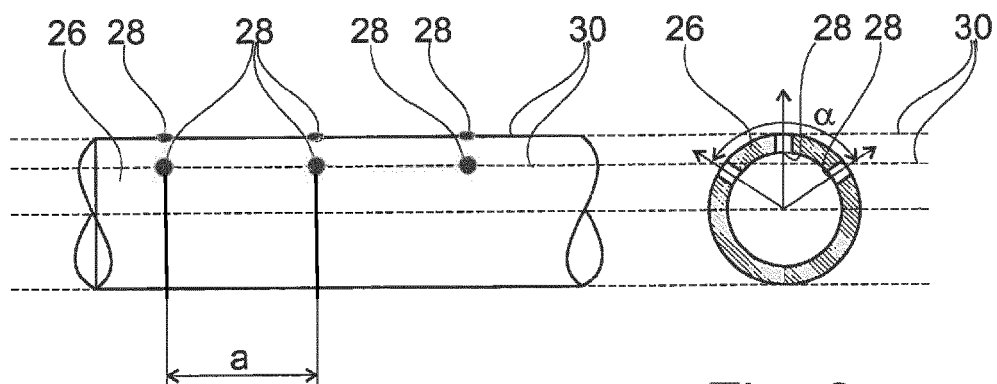
Fig. 7
Fig. 8

US 9,494,282 B2

STORAGE CONTAINER FOR CRYOGENIC COMPRESSED GAS HAVING AN INLET

CROSS REFERENCE TO RELATED APPLICATIONS

This application is a continuation of PCT International Application No. PCT/EP2012/073759, filed Nov. 27, 2012, which claims priority under 35 U.S.C. §119 from German Patent Application No. 10 2012 200 554.4, filed Jan. 16, 2012, the entire disclosures of which are herein expressly incorporated by reference.

BACKGROUND AND SUMMARY OF THE INVENTION

The invention relates to a storage container for cryogenic compressed gas, particularly a cryo-compressed tank for a motor vehicle, having a storage volume for accommodating the stored gas and an inlet for introducing the gas to be stored into the storage volume.

For operating motor vehicles, for example, ones that use hydrogen or natural gas as a fuel, it is known to store the gas in the subcritical condition in a special pressure resistant container. In this case, the supercold gas is stored in the supercritical condition at a high pressure (13 bar to 350 bar) in a gaseous state. For this purpose, it has to be avoided that heat can enter into the storage container from the environment. The storage container therefore requires a very good, as a rule, double-walled super-insulation with a high vacuum.

When filling or refueling such a storage container with supercold gas, its storage content also has to be kept in a uniform manner at a sufficiently low temperature. This is not always the case at existing storage containers.

According to the invention, a storage container for cryogenic compressed gas, particularly a cryo-compressed tank for a motor vehicle, is created which has a storage volume for the accommodation of the stored gas and an inlet for introducing the gas to be stored into the storage volume, the inlet being designed with a pipe-shaped inlet line projecting into the storage volume, at which inlet line several mutually spaced inlet openings are provided.

The solution according to the invention is based on the recognition that the gas introduced into the storage container has at least a slightly lower temperature than at least portions of the base in the storage volume. In the case of a locally limited charging of gas into the storage volume, the problem therefore occurs that the stored gas is first locally cooled and, only after the refueling, a temperature balancing takes place toward the residual storage volume and its storage device wall. This effect occurs particularly in the case of a partly or completely emptied storage container. The thereby caused later heat input into the stored gas causes a further pressure buildup in the storage container. After the refueling is completed, this leads to a subsequent overshooting of the tank pressure. The storage container is therefore overcharged, which could possibly result in a shortening of the loss-free time of the storage container. Furthermore, non-uniform cooling of the storage container cause strong thermomechanical stresses on its storage container wall which should also be avoided.

By way of the solution according to the invention, the supercold cryo-compressed gas to be stored is axially as well as radially introduced into the storage volume in a particularly uniformly distributed manner. In this case, a purely local cooling, particularly of the storage container wall, is avoided. The solution according to the invention thereby avoids a later overshooting of the tank pressure even in the case of a complete refueling.

In an advantageous further development of the solution according to the invention, the inlet line is designed as a pipe, and the inlet openings are arranged at the pipe on the circumference at an angular distance of 60° (degrees) respectively. Such a design of the inlet line as a pipe, which projects into the storage volume, contributes to an additional temperature equalization of the introduced gas when flowing through the inlet line. With respect to manufacturing, the arranging of the inlet openings in rows can be produced in a safe and cost-effective process.

Preferably, the inlet openings are arranged closely side-by-side in the center of the storage volume. Here, "closely side-by-side" means that the inlet openings are arranged comparatively closely side-by-side at a distance of maximally ten times their own diameter. The selected arrangement in the center of the storage volume contributes to the fact that the introduced gas is uniformly distributed in the storage volume. In addition, this arrangement of the inlet openings results in a largely uniformly far distance between the introduction area and the storage container wall.

Further preferably, the inlet openings extend in an upward direction in the center of the storage volume.

As an alternative, the inlet openings are arranged closely side-by-side on a side of the storage volume. Such an arrangement may be advantageous because the introduced gas can be introduced through the inlet openings in a targeted manner into the storage volume such that it is distributed in the storage volume without coming too close to the storage container wall.

A particularly uniform distribution of the introduced gas into the storage container can be achieved in that the inlet line is designed as a pipe and the inlet openings are arranged at the pipe in three rows spaced at the circumference at an angular distance of 120° respectively.

As an alternative, the inlet line can advantageously be designed as a pipe, at which the inlet openings are arranged in one row. Such a solution can be produced more cost-effectively.

In order to obtain a uniform distribution, particularly in a cylindrical storage volume, it is preferred according to the invention that the pipe extends transversely through the storage volume and the inlet openings are arranged in a spaced manner along the longitudinal dimension of the pipe.

Particularly preferably, 36 circular inlet openings are provided, each with a diameter of 1 mm (millimeter). As an alternative, preferably 12 circular inlet openings are provided, each with a diameter of 1.7 mm.

For a directed introduction of the gas to be introduced, also diagonally to the direction of the used inlet line, the inlet openings are preferably aligned at the pipe diagonally to its longitudinal dimension, particularly at an angle of less than 45°.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 6 is a longitudinal sectional view of a fourth embodiment of a storage container according to the invention;

FIG. 7 is a lateral view of a section of an inlet line of a storage container, which inlet line has rows of inlet openings extending only in an upward direction;

FIG. 8 is a cross-sectional view of the inlet line according to FIG. 7;

DETAILED DESCRIPTION OF THE DRAWINGS

Figure 1:
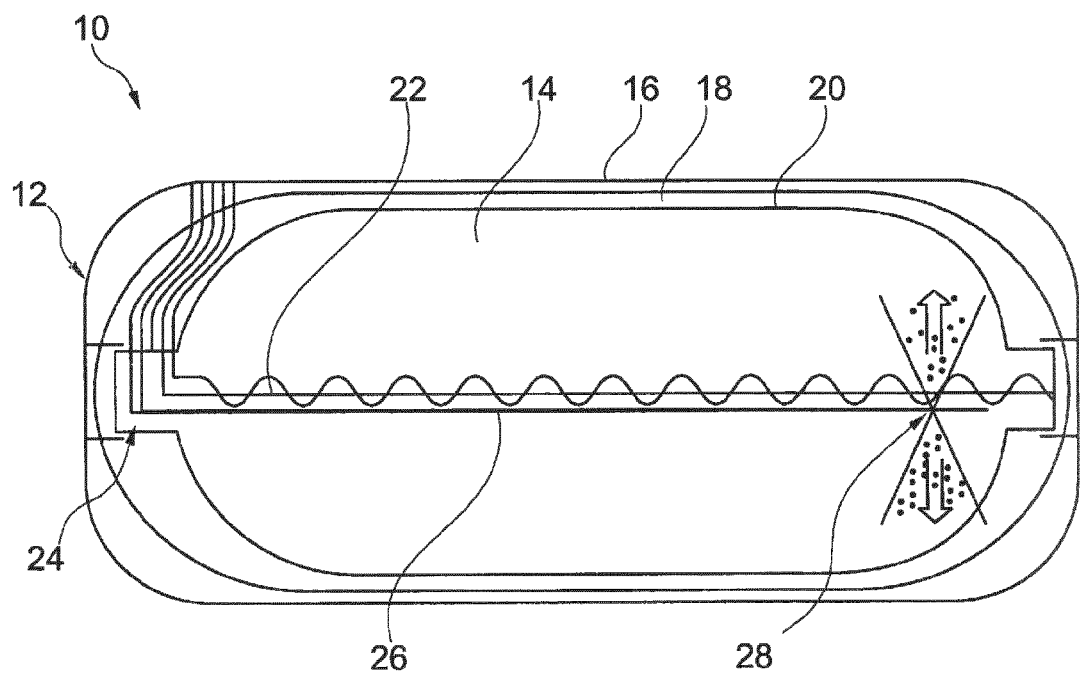
FIG. 1 is a longitudinal sectional view of a first embodiment of a storage container according to the invention.

The figures illustrate embodiments of storage containers 10 for compressed hydrogen gas ($CcH_2$), so-called "cryo-compressed hydrogen tank". The cryogenic gas stored therein is suitable for any type of $H_2$ energy converters and is preferably used for driving an internal-combustion engine of vehicle (not shown in detail). The gas is taken out of the energy container 10 for that purpose and is supplied to the internal-combustion engine.

The $CcH_2$ is stored in the storage container 10 at a very low temperature at supercritical pressure. For this purpose, the storage container 10 has an outer tank or a storage housing 12 which surrounds a storage volume 14 for accommodating the gas in a fluid-tight manner. The storage housing 12 is formed by an exterior cover 16, an insulation 18 arranged therein and an interior tank or an interior storage container wall 20. A heat exchanger 22 is introduced into the storage volume 14 by which the stored gas can be heated.

For refueling the storage container 10, an inlet 24 is provided by which $CcH_2$ can be introduced into the storage volume 14. The gas introduced in this manner has at least a slightly lower temperature than the gas already situated in the storage volume 14.

In order to avoid a non-uniform temperature in the storage container wall 20, and temperature stress possibly connected therewith, the inlet 24 according to all embodiments is designed as an inlet line 26 constructed as a pipe, which projects into the storage volume 14 and is used as a refueling line as well as a withdrawal line.

Figure 2:
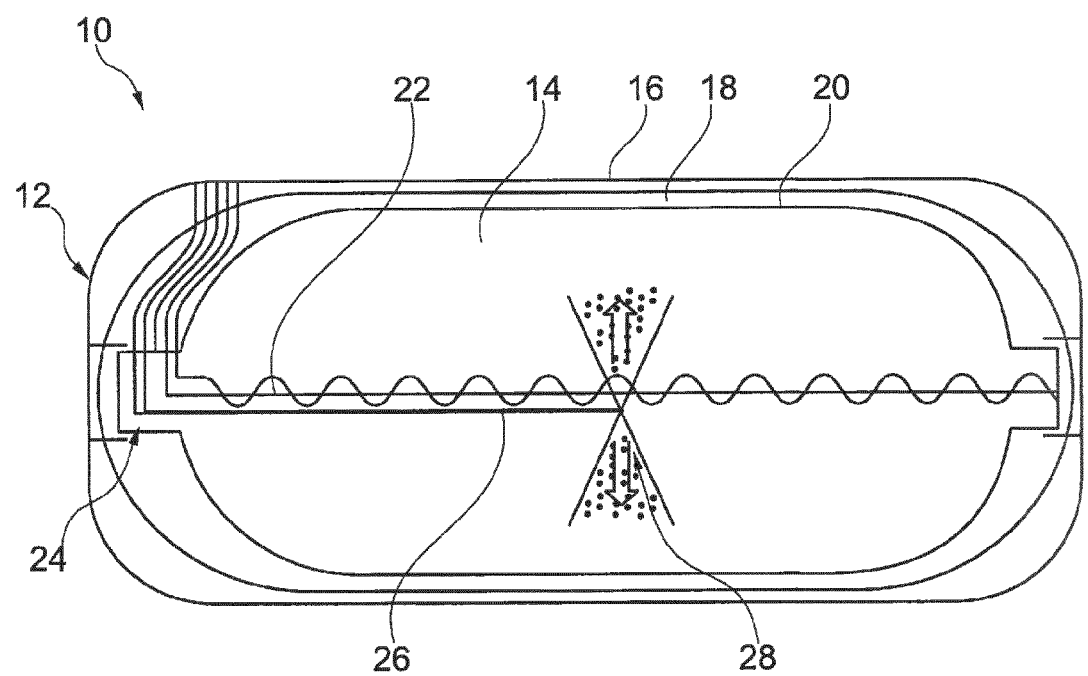
FIG. 2 is a longitudinal sectional view of a second embodiment of a storage container according to the invention.
Figures 3, 4:
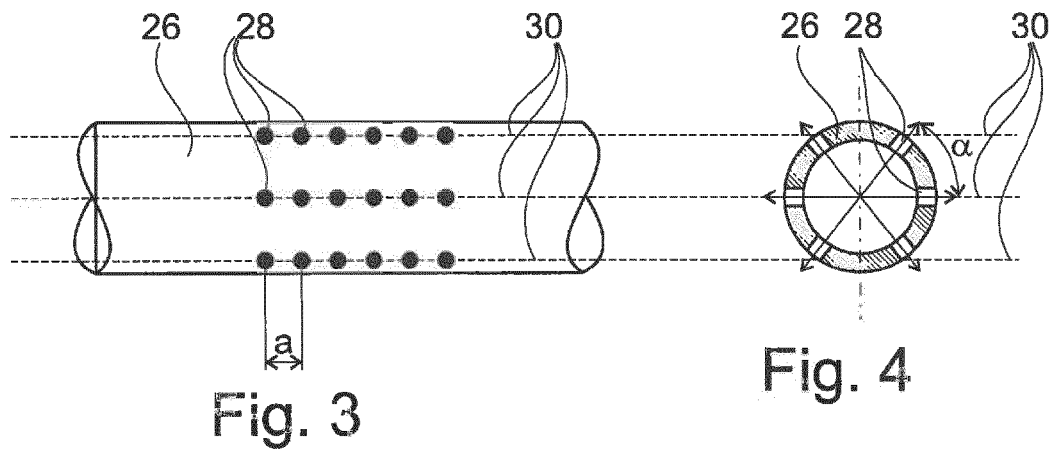
FIG. 3 is a lateral view of a section of the inlet lines of the storage containers according to FIG. 1 and FIG. 2.
FIG. 4 is a cross-sectional view of the inlet line according to FIG. 3.
Figure 5:
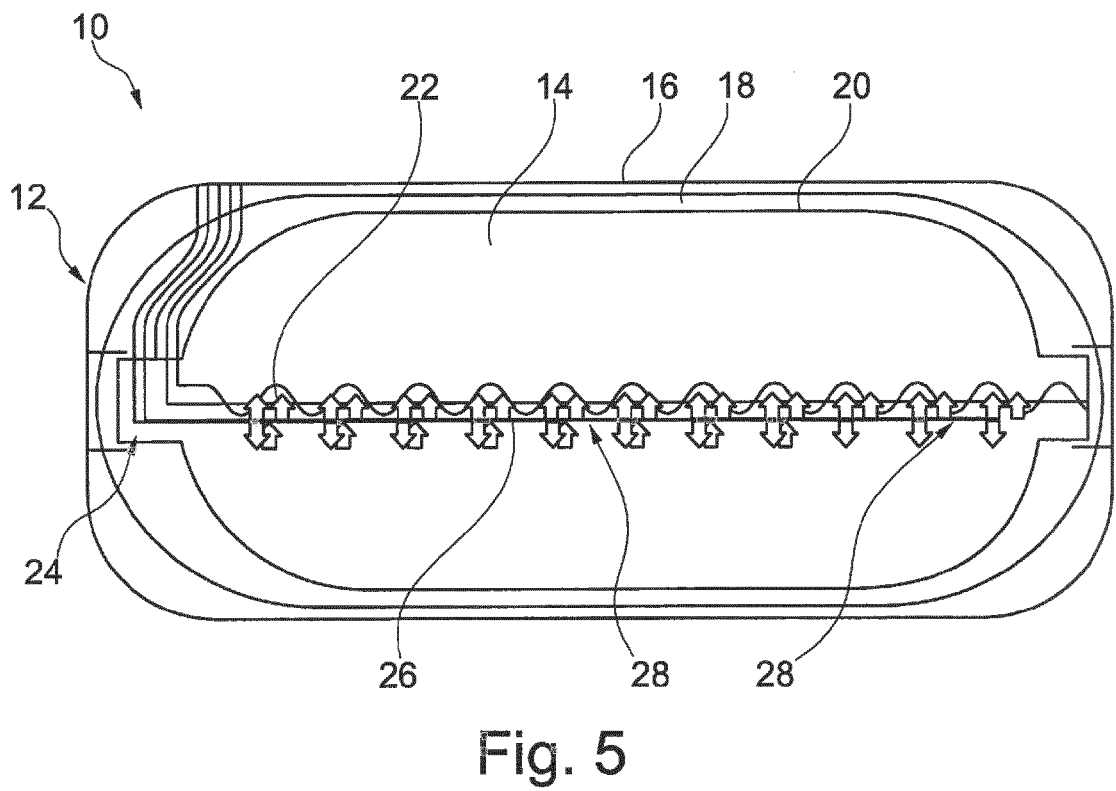
FIG. 5 is a longitudinal sectional view of a third embodiment of a storage container according to the invention.
Figure 9:
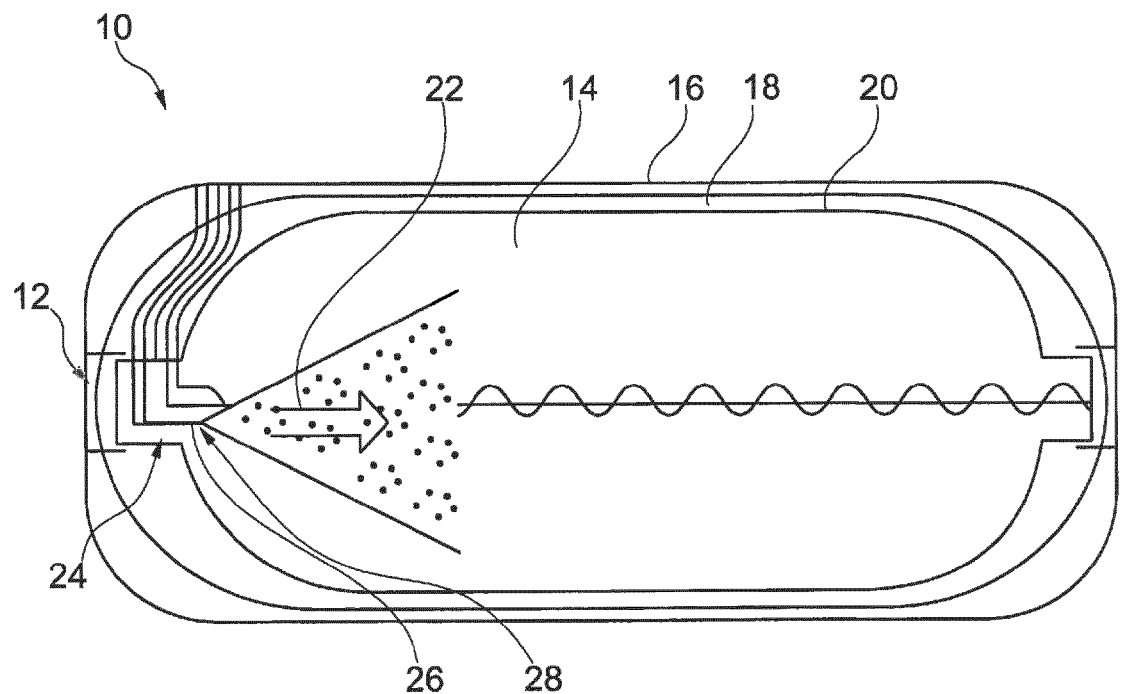
FIG. 9 is a longitudinal sectional view of another embodiment of a storage container according to the invention.
Figures 10, 11:
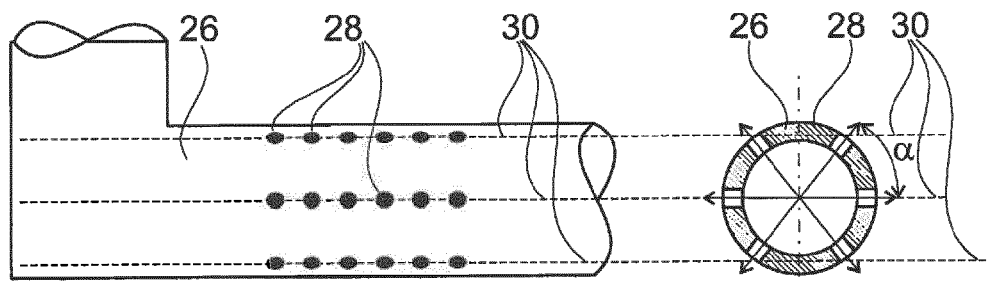
FIG. 10 is a lateral view of a section of the inlet line of the storage container according to FIG. 9.
FIG. 11 is a cross-sectional view of the inlet line according to FIG. 10.
Figure 12:
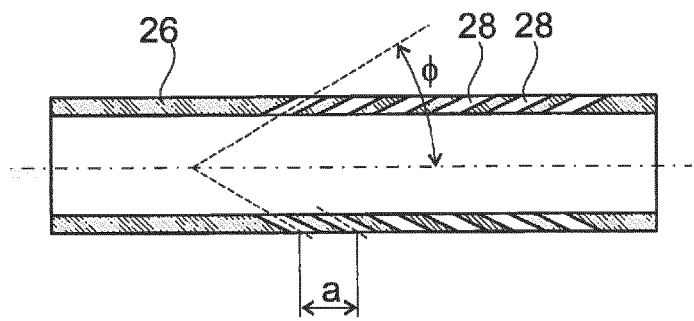
FIG. 12 is a longitudinal sectional view of the inlet line according to FIG. 10.

In the embodiment according to FIG. 1, the inlet line 26 extends transversely through the entire storage volume 14 and, at its end section, has several inlet openings 28 spaced with respect to one another. FIG. 2 illustrates an embodiment in which the inlet line 26 extends in a pipe-shaped manner to the center of the storage volume 14. In this case, several inlet openings 28 are again situated at the end section of the inlet line 26. As illustrated in FIGS. 3 and 4, in the embodiments according to FIGS. 1 and 2, in each case, the inlet openings 28 are arranged in six rows 30 spaced at the circumference at an angular distance α (alpha) of 60° (degrees) respectively at the inlet line 26. The inlet openings 26 are arranged closely side-by-side along a length of 40 mm (millimeters) to 60 mm, preferably 50 mm, at respective distances a of 4 mm to 13 mm, preferably 9 mm and each have a diameter of 0.8 mm to 1.2 mm, preferably 1 mm.

FIGS. 5 to 8 illustrate different embodiments, in which the pipe-shaped inlet line 26 also extends transversely through the entire storage volume 14. Largely distributed along the entire longitudinal dimension of the inlet line 26, the inlet openings 28 are arranged in a mutually spaced manner at equal distances a of approximately 20 mm to 80 mm, preferably 50 mm. In this case, according to FIGS. 7 and 8, three rows 30 with inlet openings 28 are distributed at the circumference of the inlet line 26. The three rows 30 enclose an angular distance α of 120°. Preferably, as shown in FIGS. 7 and 8, the three rows 30 are formed on an upper half of the inlet line 26 such that the inlet openings 28 all extend in an upward direction.

In the embodiment according to FIG. 6, only one row of inlet openings 28 is provided, which openings 28 all extend in the upward direction. The inlet openings 28 of these embodiments according to FIGS. 5 to 8 have a diameter of 1.5 mm to 1.9 mm, preferably 1.7 mm.

Finally, FIGS. 9 to 12 show an embodiment in which the inlet line 26 projects only a relatively short distance into the storage volume 14. At its end section, such a pipe-shaped inlet line 26 has six rows 30 with six inlet openings 28 respectively, which each extend at an angle Φ (Phi) of from 30° to 60°, preferably 45° diagonally with respect to the longitudinal dimension of the inlet line 26.

By means of the inlet openings 28 constructed in this manner at the inlet lines 26, the gas to be stored is distributed axially as well as radially particularly uniformly into the storage volume 14. In particular, there is no locally limited heating-up of the storage container wall 20.

LIST OF REFERENCE SYMBOLS

10 Storage container for cryogenic compressed gas, particularly a cryo-compressed tank
12 Storage housing
14 Storage volume for accommodating the stored gas
16 Exterior cover
18 Insulation
20 Storage container wall
22 Heat exchanger
24 Inlet
26 Inlet line designed as a pipe
28 Inlet opening
30 Row The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A storage container for cryogenic compressed gas, comprising:
    an approximately cylindrical, double-wall insulated, storage volume for storing the cryogenic compressed gas in supercritical condition at high pressure up to at least 350 bar under super cold conditions;
    an inlet configured for introducing the cryogenic compressed gas to be stored in the storage volume, wherein the inlet comprises a pipe-shaped inlet line configured to project into the storage volume, the inlet line extends transversely through the entire storage volume in a direction of a cylinder axis of the approximately cylindrical storage volume, the inlet line has several mutually spaced inlet openings, and the inlet line is provided in a center of the storage volume.

2. The storage container according to claim 1, wherein the inlet openings have a diameter of 1.5 mm to 1.9 mm and extend only in an upward direction in the storage volume.

3. The storage container according to claim 2, wherein the inlet openings are arranged closely side-by-side in the center of the storage volume.

4. The storage container according to claim 1, wherein the inlet openings are arranged closely side-by-side in the center of the storage volume.

5. The storage container according to claim 1, wherein the several mutually spaced inlet openings are arranged in one row along a longitudinal dimension of the pipe.

6. The storage container according to claim 1, wherein the several mutually spaced inlet openings have a diameter of 1.5 mm to 1.9 mm and are arranged in three rows along a longitudinal dimension of the pipe.

7. The storage container according to claim 6, wherein the three rows are arranged at the pipe within an angular circumference of 120°.

8. The storage container according to claim 7, wherein the three rows are arranged such that their respective inlet openings extend only in an upward direction.

9. The storage container according to claim 1, wherein the storage container is a cryo-compressed tank for a motor vehicle.

10. The storage container according to claim 1, wherein the inlet openings extend diagonally with respect to a longitudinal dimension of the pipe-shaped inlet line.

11. The storage container according to claim 1, wherein the inlet openings are arranged in longitudinally extending rows in the pipe-shaped inlet line.

12. The storage container according to claim 1, wherein the inlet openings each extend at an angle of from 30° to 60° diagonally with respect to the longitudinal dimension of the inlet line.

* * * * *